(12) United States Patent
Todd et al.

(10) Patent No.: US 11,164,115 B1
(45) Date of Patent: Nov. 2, 2021

(54) CAPACITY PLANNING AND DATA PLACEMENT MANAGEMENT IN MULTI-CLOUD COMPUTING ENVIRONMENT

(71) Applicant: EMC IP Holding Company LLC, Hopkinton, MA (US)

(72) Inventors: Stephen J. Todd, Shrewsbury, MA (US); Assaf Natanzon, Tel Aviv (IL); Kenneth Durazzo, San Jose, CA (US)

(73) Assignee: EMC IP Holding Company LLC, Hopkinton, MA (US)

(*) Notice: Subject to any disclaimer, the term of this patent is extended or adjusted under 35 U.S.C. 154(b) by 188 days.

(21) Appl. No.: 15/887,460

(22) Filed: Feb. 2, 2018

(51) Int. Cl.
| | |
|---|---|
| *G06Q 10/06* | (2012.01) |
| *H04L 9/06* | (2006.01) |
| *G06F 21/62* | (2013.01) |
| *H04L 29/08* | (2006.01) |

(52) U.S. Cl.
CPC ....... *G06Q 10/063* (2013.01); *G06F 21/6218* (2013.01); *H04L 9/0637* (2013.01); *H04L 67/104* (2013.01); *H04L 9/0643* (2013.01); *H04L 2209/38* (2013.01)

(58) Field of Classification Search
CPC . G06Q 10/063; G06F 21/6218; H04L 9/0637; H04L 67/104; H04L 9/0643; H04L 2209/38
USPC ........................................................ 705/7.11
See application file for complete search history.

(56) References Cited

U.S. PATENT DOCUMENTS

| | | | | |
|---|---|---|---|---|
| 9,280,683 | B1* | 3/2016 | Echeverria | ............ G06F 16/183 |
| 9,600,376 | B1* | 3/2017 | Krinke, II | ........... G06F 11/1458 |
| 9,923,785 | B1* | 3/2018 | Li | ........................ H04L 41/5025 |
| 10,402,733 | B1* | 9/2019 | Li | ........................... G06N 7/005 |
| 10,564,870 | B1* | 2/2020 | Greenwood | .......... G06F 3/0631 |

(Continued)

OTHER PUBLICATIONS

T.P. Shabeera, "Optimizing VM allocation and data placement for data-intensive applications in cloud using ACO metaheuristic algorithm", Engineering Science and Technology, an International Journal, 20 (2017) 616-628 (Year: 2017).*

(Continued)

*Primary Examiner* — Rutao Wu
*Assistant Examiner* — Abdallah A El-Hage Hassan
(74) *Attorney, Agent, or Firm* — Ryan, Mason & Lewis, LLP (57) ABSTRACT

In a multi-cloud computing environment comprising a plurality of cloud platforms across which an enterprise stores primary data and copies of the primary data, a method maintains a distributed ledger system with a plurality of nodes, wherein a given one of the plurality of cloud platforms is operatively coupled to a given one of the plurality of nodes of the distributed ledger system. Further, the method manages capacity planning and data placement for the primary data and the copies of the primary data in association with the distributed ledger system by storing transaction data in the distributed ledger system that represents at least one of one or more pricing models associated with each cloud platform and one or more regulatory policies associated with each cloud platform to enable an environment-wide view of at least one of the pricing models and the regulatory policies of the plurality of cloud platforms.

20 Claims, 9 Drawing Sheets

(56) References Cited

U.S. PATENT DOCUMENTS

| | | | | |
|---|---|---|---|---|
| 2014/0136571 A1* | 5/2014 | Bonvin | ............... | G06F 16/2219 707/792 |
| 2014/0214496 A1* | 7/2014 | Macbeath | .......... | G06Q 30/0283 705/7.37 |
| 2015/0381435 A1* | 12/2015 | Todd | ..................... | G06F 9/4856 709/223 |
| 2017/0207971 A1* | 7/2017 | Kripalani | ................ | H04L 67/34 |
| 2018/0262413 A1* | 9/2018 | Sureka | .................. | H04L 47/762 |
| 2019/0097807 A1* | 3/2019 | Mahanta | ................. | H04L 63/10 |

OTHER PUBLICATIONS

Sonia Ikken, "Cost-Efficient Big Intermediate Data Placement in a Collaborative Cloud Storage Environment", IEEE Conference on High Performance Computing and Communications. 2017 (Year: 2017).*

Alifah Aida Lope Abdul Rahman, "A Risk Management Approach for a Sustainable Cloud Migration" Journal of risk and financial management, Sep. 26, 2017 (Year: 2017).*

U.S. Appl. No. 15/789,263 filed in the name of Stephen Todd et al. Oct. 20, 2017 and entitled "Distributed Data Protection Management In Multi-Cloud Computing Environment."

Satoshi Nakamoto, "Bitcoin: A Peer-to-Peer Electronic Cash System," http://bitcoin.org/bitcoin.pdf, 2008, 9 pages.

U.S. Appl. No. 15/730,990 filed in the name of Stephen Todd et al. Oct. 12, 2017 and entitled "Data Management for Extended Multi-Cloud Environment."

U.S. Appl. No. 15/136,327 filed in the name of Stephen Todd et al. Apr. 22, 2016 and entitled "Calculating Data Value Via Data Protection Analytics."

* cited by examiner

902 — IN A MULTI-CLOUD COMPUTING ENVIRONMENT COMPRISING A PLURALITY OF CLOUD PLATFORMS ACROSS WHICH AN ENTERPRISE STORES PRIMARY DATA AND COPIES OF THE PRIMARY DATA, MAINTAIN A DISTRIBUTED LEDGER SYSTEM WITH A PLURALITY OF NODES, WHEREIN A GIVEN ONE OF THE PLURALITY OF CLOUD PLATFORMS IS OPERATIVELY COUPLED TO A GIVEN ONE OF THE PLURALITY OF NODES OF THE DISTRIBUTED LEDGER SYSTEM

904 — MANAGE CAPACITY PLANNING AND DATA PLACEMENT FOR THE PRIMARY DATA AND THE COPIES OF THE PRIMARY DATA IN ASSOCIATION WITH THE DISTRIBUTED LEDGER SYSTEM BY STORING TRANSACTION DATA IN THE DISTRIBUTED LEDGER SYSTEM THAT REPRESENTS AT LEAST ONE OF ONE OR MORE PRICING MODELS ASSOCIATED WITH EACH CLOUD PLATFORM AND ONE OR MORE REGULATORY POLICIES ASSOCIATED WITH EACH CLOUD PLATFORM TO ENABLE AN ENVIRONMENT-WIDE VIEW OF AT LEAST ONE OF PRICING MODELS AND REGULATORY POLICIES OF THE PLURALITY OF CLOUD PLATFORMS

FIG. 10

CAPACITY PLANNING AND DATA PLACEMENT MANAGEMENT IN MULTI-CLOUD COMPUTING ENVIRONMENT

FIELD

The field relates generally to multi-cloud computing environments, and more particularly to techniques for management of capacity planning and data placement in such multi-cloud computing environments.

BACKGROUND

Enterprises such as corporations typically utilize a cloud computing environment to manage their data. One or more cloud platforms that are part of this environment may be within the exclusive control and management of the enterprise, and therefore are considered "private clouds." On the other hand, the cloud computing environment can include one or more cloud platforms that can be used by multiple enterprises, and not necessarily controlled or managed by any of the multiple enterprises but rather are controlled and managed by one or more third-party cloud providers. Such cloud platforms are typically considered "public clouds." More typically, enterprises may choose to host their data (as well as applications, workloads, services, etc.) on a combination of private and public clouds that form a multi-cloud computing environment. One or more clouds may also be referred to as a "data center." Alternatively, a data center may be comprised of one or more clouds.

However, as more and more enterprise data is stored across the multi-cloud computing environment, and as computing environments and data storage compliance regulations change over time, managing the data can be a significant challenge for the enterprise.

SUMMARY

Embodiments of the invention provide systems and methods for management of capacity planning and data placement in a multi-cloud computing environment.

For example, in one embodiment, a method comprises the following steps. In a multi-cloud computing environment comprising a plurality of cloud platforms across which an enterprise stores primary data and copies of the primary data, the method maintains a distributed ledger system with a plurality of nodes, wherein a given one of the plurality of cloud platforms is operatively coupled to a given one of the plurality of nodes of the distributed ledger system. Further, the method manages capacity planning and data placement for the primary data and the copies of the primary data in association with the distributed ledger system by storing transaction data in the distributed ledger system that represents at least one of one or more pricing models associated with each cloud platform and one or more regulatory policies associated with each cloud platform to enable an environment-wide view of at least one of the pricing models and the regulatory policies of the plurality of cloud platforms.

Advantageously, illustrative embodiments utilize distributed data management techniques in a multi-cloud computing environment to overcome drawbacks associated with existing capacity planning and data placement approaches.

These and other features and advantages of the invention will become more readily apparent from the accompanying drawings and the following detailed description.

DETAILED DESCRIPTION

Illustrative embodiments will be described herein with reference to exemplary information processing systems and associated host devices, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual computing resources. An information processing system may therefore comprise, for example, a cloud infrastructure hosting multiple tenants that share cloud computing resources. Such systems are considered examples of what are more generally referred to herein as cloud computing environments. Environments that implement multiple cloud platforms are referred to as multi-cloud computing environments. As mentioned above, a multi-cloud computing environment employed by an enterprise may comprise a combination of one or more private clouds and one or more public clouds. The term "enterprise" as used herein is intended to be broadly construed, and may comprise, for example, one or more businesses, one or more corporations or any other one or more entities, groups, or organizations. An "entity" as illustratively used herein may be a person or system.

Illustrative embodiments provide techniques for distributed management of capacity planning and data placement associated with primary data and data protection ecosystems in a multi-cloud computing environment. The multi-cloud computing environment may include a wide variety of computing resources that form an information processing system. The term "computing resource," as illustratively used herein, can refer to any device, endpoint, component, element, platform, cloud, data center, storage array, client, server, gateway, or other resource, that is part of a multi-cloud computing environment associated with an enterprise. An example of a multi-cloud computing environment associated with an enterprise is shown in FIG. 1.

Figure 1:
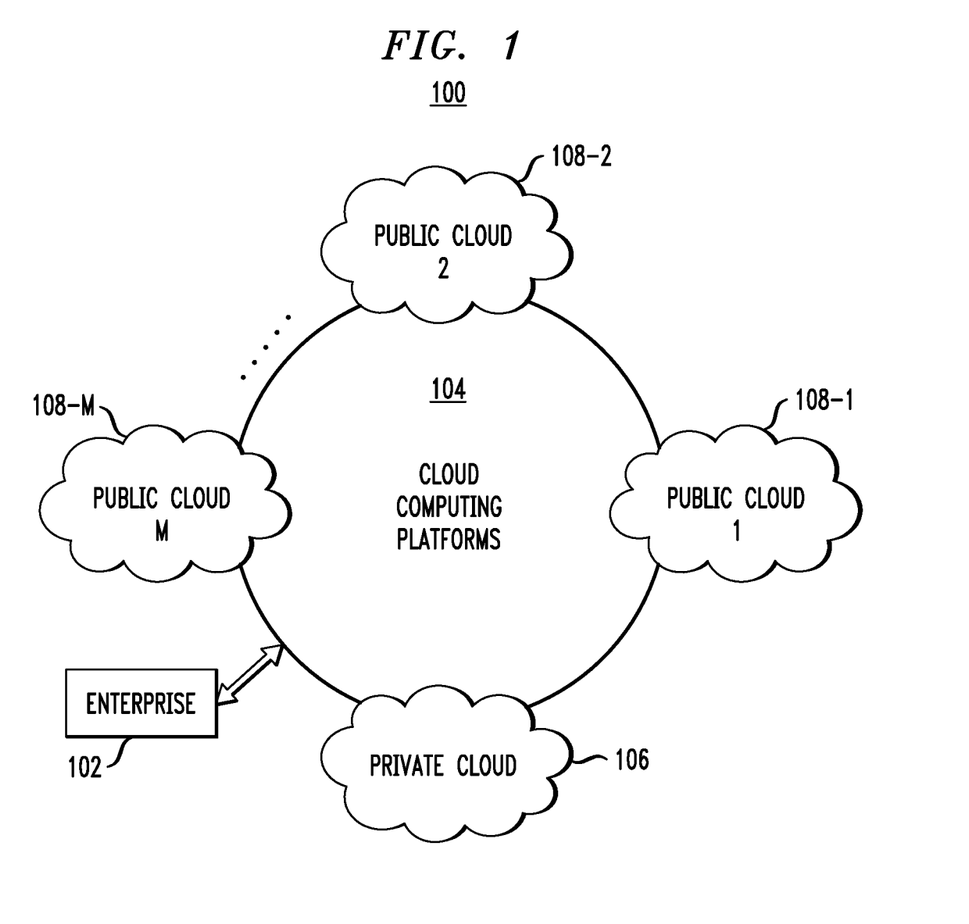
FIG. 1 illustrates a multi-cloud computing environment associated with an enterprise with which one or more illustrative embodiments may be implemented.

As shown in FIG. 1, multi-cloud computing environment 100 comprises an enterprise 102 and a set of cloud computing platforms 104 upon which the enterprise 102 hosts its application programs and data assets. The set of cloud computing platforms 104 comprises a private cloud 106 and a plurality of public clouds 108-1, 108-2, . . . , 108-M. It is to be appreciated, however, that there can be more than one private cloud in the multi-cloud computing environment 100. Still further, the environment 100 can alternatively be composed of only private clouds or only public clouds. Note that specific cloud infrastructure may be purpose-built to serve as a destination for cloud native applications while some may be purpose-built for traditional applications. Examples of public clouds may include, but are not limited to, Amazon Web Services® (AWS), Google Compute Engine® (GCE), and Windows Azure® Services platforms.

There has been a proposal to provide decentralized management of data in multi-cloud computing environments that tracks the creation of data, the type of data being created, where data is being created, the deletion of data, and the value of data in the context of data protection ecosystems. For example, such a system is described in U.S. patent application Ser. No. 15/789,263, entitled "Distributed Data Protection Management in Multi-Cloud Computing Environment" and filed Oct. 20, 2017, the disclosure of which is incorporated by reference herein in its entirety. Such a system facilitates the management of data generated in accordance with a data protection ecosystem, and eventual deletion of data protection copies that may have proliferated across a multi-cloud computing environment. The term "data protection ecosystem" illustratively refers to a system (e.g., comprising devices, subsystems, tools, algorithms, policies, schedules, mappings, catalogs, backup data, etc.) that protects data. By way of example, the data that is being protected may be part of a "production environment" or "primary storage environment," i.e., a data storage environment where data is accessible online by one or more clients such as a private cloud (e.g., 106 in FIG. 1) or a public cloud (e.g., one of public clouds 108-1, 108-2, . . . , 108-M in FIG. 1). Backup data, metadata, and analytics results are obtained during the course of the data protection ecosystem providing data backup and recovery functionalities for the primary storage environment. Data stored by primary or production storage is referred to herein as "primary data," while data stored by data protection ecosystems is referred to herein as "copies of the primary data."

Some of the challenges associated with data copy management across a multi-cloud computing environment (e.g., 100 in FIG. 1) are highlighted below in the context of FIGS. 2 and 3.

Figure 2:
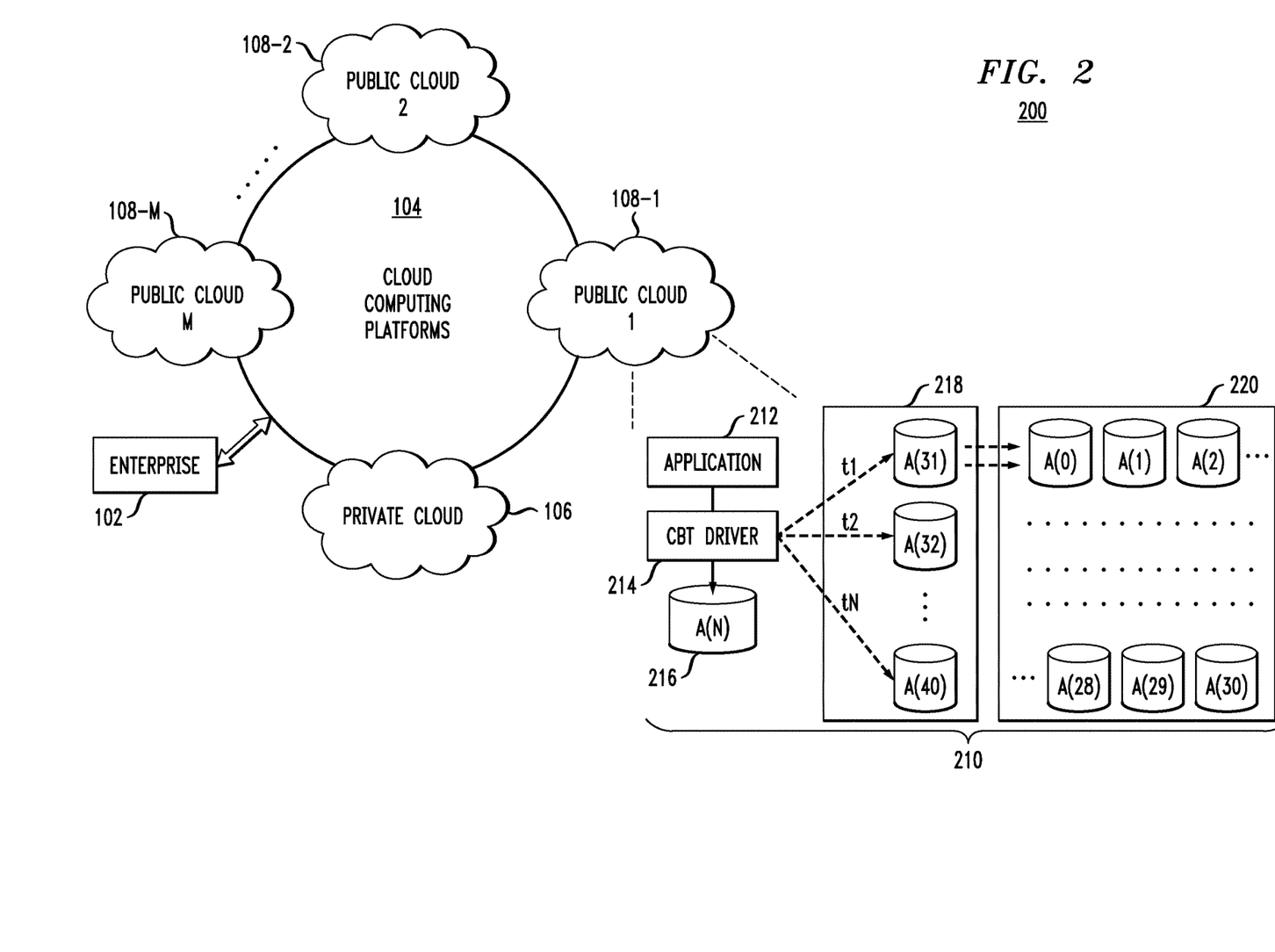
FIG. 2 illustrates the multi-cloud computing environment of FIG. 1 with an example of a data protection ecosystem associated with one of the cloud platforms.

FIG. 2 illustrates a multi-cloud computing environment 200 with the set of cloud platforms 104 (FIG. 1) and a data protection ecosystem 210 associated with one of the cloud platforms, i.e., public cloud 108-1. More particularly, FIG. 2 depicts an application workload 212 that has been assigned to execute on computing resources of public cloud 108-1. It is assumed that this application workload 212 is also executing a data protection algorithm 214 that utilizes changed block tracking (CBT). A CBT data protection algorithm operates on a block storage device and indicates the blocks in the device that have changed since the last backup operation. Thus, in FIG. 2, it is assumed that the data protection ecosystem 210 utilizes CBT and protects a primary data set 216 (A(N)) by creating ten time-based copies and storing them in a higher-cost cloud protection tier 218 (e.g., Amazon S3) while older copies are moved to a lower-cost, slower data protection tier 220 (e.g., 30 copies are kept in Amazon Glacier). It is to be understood that "higher-cost" versus "lower-cost" are relative terms with respect to a cost comparison of the two protection tier examples given, i.e., Amazon S3 costs more to store data than Amazon Glacier.

It should be understood that CBT is exemplary and any data protection mechanism can be used. CBT will typically be used when trying to move snapshots or snaps (data set copies) across clouds. However, in other cloud platforms, native snapshots and internal mechanism may be used to efficiently create copies. The point to be appreciated is that the data protection scenario depicted in FIG. 2, or some other data protection scenario, can occur across every cloud platform within the multi-cloud computing environment. Likewise, some cloud platforms may store primary or production data for an enterprise, while other cloud platforms may store protection copies.

Figure 3:
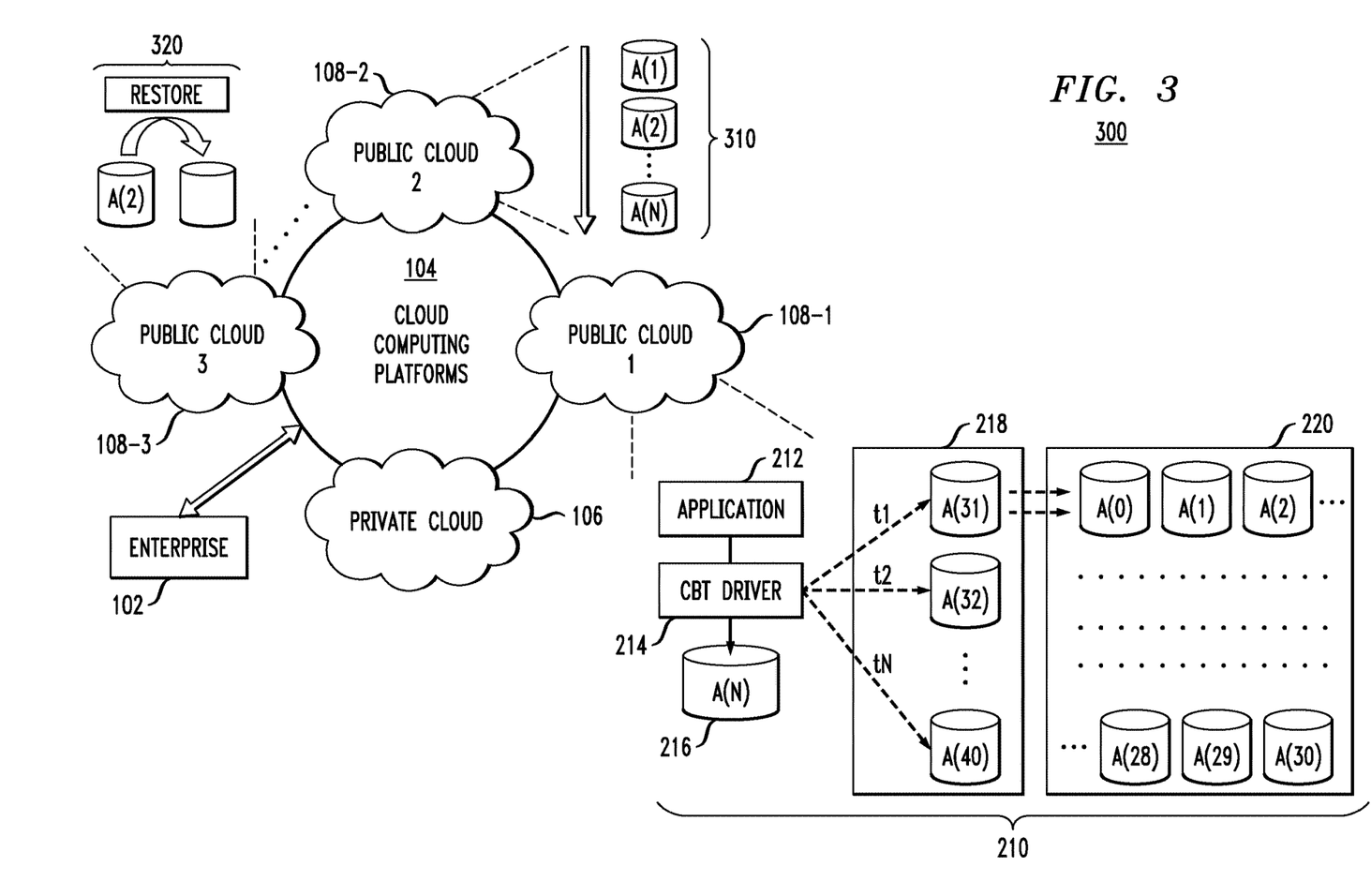
FIG. 3 illustrates the multi-cloud computing environment of FIG. 1 with an example of primary data and data protection ecosystems associated with multiple ones of the cloud platforms.

FIG. 3 illustrates a multi-cloud computing environment 300 with the set of cloud platforms 104 (FIG. 1) and primary data and data protection ecosystems associated with multiple ones of three cloud platforms, i.e., public cloud 108-1 having data protection ecosystem 210, public cloud 108-2 storing primary data 310, and public cloud 108-3 having data protection ecosystem 320 (restore functionality). The choice of a particular cloud provider, such as AWS, may be made for any number of reasons. Over time a customer may choose to store data and data protection copies across numerous cloud providers (e.g., AWS, Azure, Google), as illustrated in FIG. 3.

It is realized herein that managing costs and compliance for data assets is a part of capacity planning. In a multi-cloud computing environment, however, capacity planning for data assets is highly challenging, as will be described below.

Cloud environments and regulations change over time. In a multi-cloud computing environment, copies of the same data may be stored in different locations in different cloud providers, see, e.g., FIG. 3. As the rules of compliance change, and as backup policies change as well, the placement of the copies of the data may have to change. As more cloud providers and data centers emerge, and as the options for placement of workloads and copies of the data increase, it is becoming increasingly difficult to remain compliant while still reducing costs.

Accordingly, problems with attempting to apply capacity planning and compliant, cost-effective placement in existing multi-cloud computing environments are as follows:

(i) Per Cloud Storage Growth Prediction

As data assets are distributed across multiple cloud providers, it becomes too complex to track the growth across all of them on a per-cloud basis.

(ii) Pricing of Data Placement in the Cloud Changes

The prices charged by cloud providers change continuously. For example, the price of an object store in Amazon may be cheapest today, while in the future it may end up being cheaper in another provider (e.g., Google). Depending on how much data is stored on a given provider, price swings and changes may have a big impact on storage expense and there is currently no way to model this across multiple clouds.

(iii) Cost of Data Movement Between Providers

Every cloud provider has a price for ingesting data (often free) and a different price for reading data. If more attractive prices appear in a different cloud provider (e.g., as described above), the price benefits may be outweighed by the cost it takes to move the data to this new provider.

(iv) Services Available for Cloud Storage May Differ

As new storage services are added across multiple cloud providers, cost of secondary copies fluctuate as well. For example, a cloud might add a de-duplication storage service that can result in significantly cheaper storage of secondary copies.

(v) Stricter/Looser Changes to Compliance Rules

As compliance rules change, stricter rules may mandate that data should move to a different location in order to remain compliant. For example, a new regulation may state that data with credit card information cannot be stored in Amazon. As a result, if there are backups of such data in Amazon, they would need to be moved. If the compliance rules become less strict (for example, data is allowed to be stored anywhere within the European Union (EU) instead of within a certain country), a move of data may not be triggered. However, such a change might open the door to a cheaper option that is still compliant. This situation is difficult to detect and execute upon with existing approaches.

(vi) Different Backup Across Multiple Clouds

Since data is being stored in multiple locations in the cloud, and it is often hard to know which backup policies are enforced. Each data protection policy may be cloud-local and have certain requirements. For example, some clouds may dictate that copies of the data must be kept in at least three locations. Other policies require data to be kept for some period of time and deleted upon expiration of that time limit. Being aware of all of the policies in place across multiple clouds and performing capacity planning in the context of these policies is currently not possible.

(vii) Tiered Pricing Models

Certain cloud providers charge different rates based on different amounts of capacity and/or multiple tiers of storage with different price/performance costs. All of these permutations make it difficult to perform proper enterprise capacity planning.

As mentioned above, U.S. patent application Ser. No. 15/789,263 describes a technique in which every copy of data present in a multi-cloud system is captured in a distributed ledger. This multi-cloud distributed data management ledger tracks the creation of data as well as recording the locations and times of any copy of the data being made as well. More particularly, multiple cloud provider data transactions (e.g., from AWS, Google, Azure) are recorded in a chain of blocks. In one exemplary embodiment, cloud-local data protection ecosystems are modified to function with a distributed ledger system such as a blockchain.

As used herein, the terms "blockchain," "digital ledger" and "blockchain digital ledger" may be used interchangeably. As is known, the blockchain or digital ledger protocol is implemented via a distributed, decentralized computer network of compute nodes (e.g., blockchain nodes or BCNs). The compute nodes are operatively coupled in a peer-to-peer communications protocol. In the computer network, each compute node is configured to maintain a blockchain which is a cryptographically secured record or ledger of data blocks that represent respective transactions within a given computational environment. The blockchain is secured through use of a cryptographic hash function. A cryptographic hash function is a cryptographic function which takes an input (or "message") and returns a fixed-size alphanumeric string, which is called the hash value (also a message digest, a digital fingerprint, a digest, or a checksum). Each blockchain is thus a growing list of data records hardened against tampering and revision, and typically includes a timestamp, current transaction data, and information linking it to a previous block. More particularly, each subsequent block in the blockchain is a data block that includes a given transaction(s) and a hash value of the previous block in the chain, i.e., the previous transaction. That is, each block is typically a group of transactions. Thus, advantageously, each data block in the blockchain represents a given set of transaction data plus a set of all previous transaction data.

In the case of a "bitcoin" implementation of a blockchain distributed ledger, the blockchain contains a record of all previous transactions that have occurred in the bitcoin network. The bitcoin system was first described in S. Nakamoto, "Bitcoin: A Peer to Peer Electronic Cash System," 2008, the disclosure of which is incorporated by reference herein in its entirety.

A key principle of the blockchain is that it is trusted. That is, it is critical to know that data in the blockchain has not been tampered with by any of the compute nodes in the computer network (or any other node or party). For this reason, a cryptographic hash function is used. While such a hash function is relatively easy to compute for a large data set, each resulting hash value is unique such that if one item of data in the blockchain is altered, the hash value changes. However, it is realized that given the constant generation of new transactions and the need for large scale computation of hash values to add the new transactions to the blockchain, the blockchain protocol rewards compute nodes that provide the computational service of calculating a new hash value. In the case of a Bitcoin network, a predetermined number of bitcoins are awarded for a predetermined amount of computation. The compute nodes thus compete for bitcoins by performing computations to generate a hash value that satisfies the blockchain protocol. Such compute nodes are referred to as "miners." Performance of the computation of a hash value that satisfies the blockchain protocol is called "proof of work." While bitcoins are one type of reward, blockchain protocols can award other measures of value (monetary or otherwise) to successful miners.

It is to be appreciated that the above description represents an illustrative implementation of the blockchain protocol and that embodiments of the invention are not limited to the above or any particular blockchain protocol implementation. As such, other appropriate processes may be used to securely maintain and add to a set of data in accordance with embodiments of the invention. For example, distributed ledgers such as, but not limited to, R3 Corda, Ethereum, MultiChain, and Hyperledger may be employed in alternative embodiments.

Figure 4:
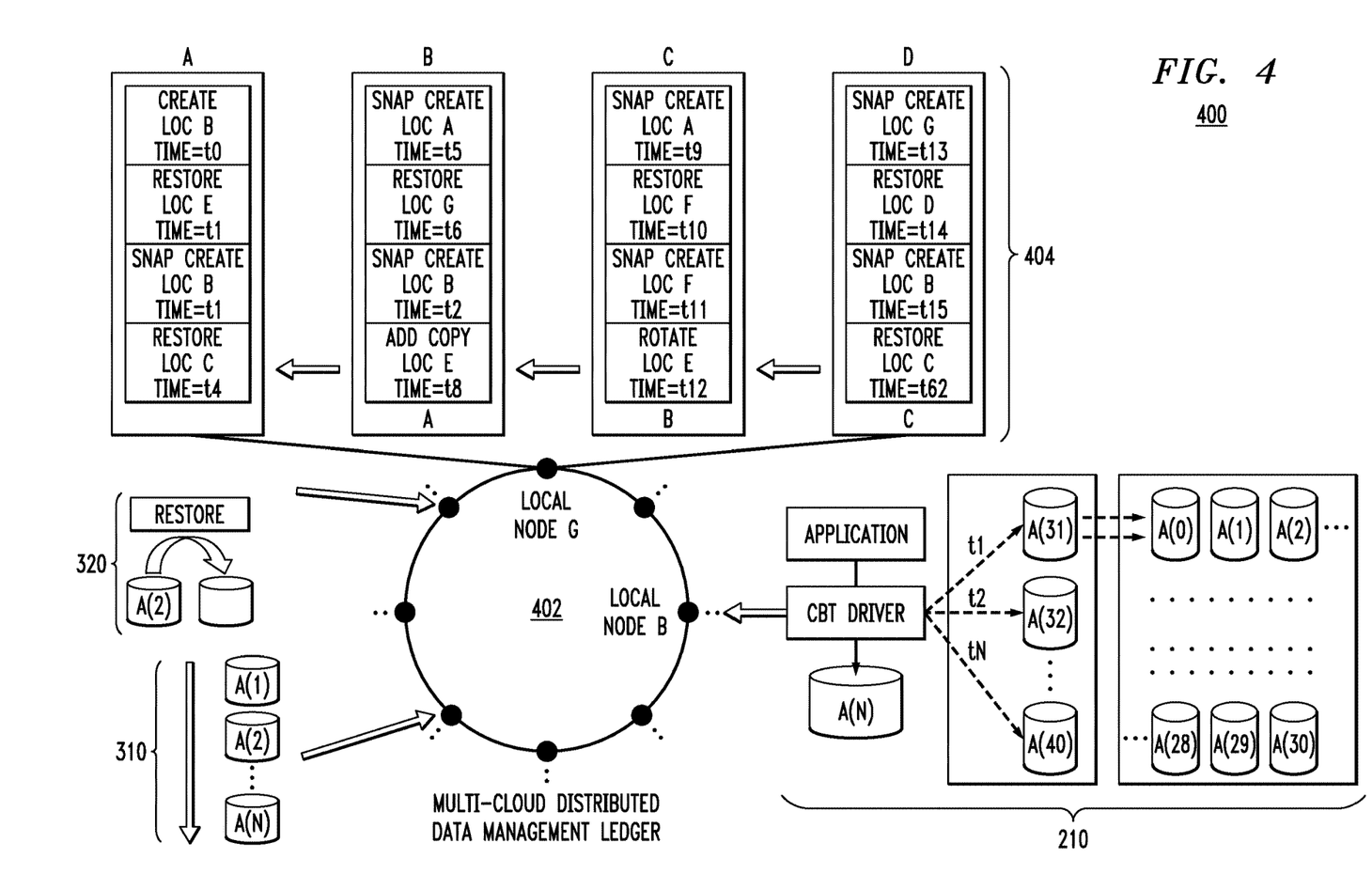
FIG. 4 illustrates at least part of a distributed data management ledger for managing data associated with primary data and data protection ecosystems of a multi-cloud computing environment, according to an illustrative embodiment.

FIG. 4 illustrates a distributed ledger system for managing primary data and data copies associated with a multi-cloud computing environment 400, according to an illustrative embodiment. As generally illustrated, a plurality of blockchain nodes are operatively coupled to form a multi-cloud distributed data management ledger system 402. A given blockchain node or BCN in the ledger system serves as a local BCN for a given one of the cloud platforms that comprise the multi-cloud computing environment. Thus, as illustratively shown in the distributed ledger system 402 in FIG. 4, respective BCNs (dark circles along the ring representing the ledger) are part of the ledger system for public cloud 1 (108-1), public cloud 2 (108-2), public cloud 3 (108-3), as well as other cloud platforms in the multi-cloud computing environment. Also, as shown, recall that primary data and data protection ecosystems are associated with multiple ones of the cloud platforms, i.e., public cloud 108-1 having data protection ecosystem 210, public cloud 108-2 storing primary data 310, and public cloud 108-3 having data protection ecosystem 320.

As contemplated in the system depicted in FIG. 4, each primary data ecosystem and/or data protection ecosystem associated with each cloud platform is configured to store one or more transactions on the distributed ledger of system 402 at a corresponding local BCN such that the one or more transactions are immutably stored on the distributed ledger and securely accessible by the plurality of BCNs in the ledger system. As shown, public cloud 1 has a data protection ecosystem 210 (as described above in the context of FIG. 2) which stores as transaction data, on its local BCN, metadata about its data protection operations (e.g., "snap transactions" associated with CBT snapshots or data copies). Similarly, public cloud 3 has a data protection ecosystem 320 illustrated as a restore operation whereby a data set copy, A(2), is used to restore a primary data set. The data protection ecosystem 320 for public cloud 3 stores as transaction data, on its local BCN, metadata about its data protection operations (e.g., "restore transactions"). Finally, as shown, primary data 310 from public cloud 2 (and/or metadata about the primary data) is stored as transaction data on the local BCN associated with public cloud 2. Thus, examples of transaction data may include, but is not limited to, metadata about one or more primary data sets, metadata about one or more copied data sets, metadata about one or more restored data sets, metadata about one or more deleted data sets, other metadata that would be useful for an enterprise to know about data being processed by a given data protection ecosystem in the multi-cloud computing environment 400. As used herein, "metadata" is generally understood to refer to any data that describes, defines or otherwise characterizes other data. Advantageously, in accordance with illustrative embodiments, individual primary data and data protection ecosystems within a given cloud now have a gateway blockchain node into which they can record transactions.

Each node (BCN) within a blockchain system (e.g., system 402) contains a full copy of the entire ledger. The distributed ledger can be navigated by a dashboard (graphical user interface) to obtain and present a view 404 of data management/protection activities (events) across a multi-cloud computing environment.

Every data management transaction is entered into the blockchain via the local node. For example, as shown in example in FIG. 4, data protection ecosystem 210 enters transaction data to its local BCN (local node B). These transactions are grouped into "blocks" (A, B, C, D) and the most recent block (D in this example) points back to the last block in the chain (e.g. block "C"). Note that the letter at the bottom of each block refers to the previous block, and block A is called the genesis block since it is the first block created. The view 404 of this chain of blocks can be displayed to a user at any of the local nodes. Given the view 404 (note that the view 404 is only one example of a visualization that can be accessed through a dashboard), the enterprise is able to ascertain how many primary and protection copies there are across the multi-cloud computing environment, as well as see them being created. Thus, when a primary data set is moved somewhere else in the multi-cloud computing environment, all copies can be moved as well. The same thing is true for deletion operations, i.e., all data set copies of a primary data set can be deleted when the primary data set is deleted. In addition, the accurate count of copies within the multi-cloud computing environment can be used to calculate a more accurate value for a given data set. The enterprise can therefore log the movement, the valuation, and the deletion into the same blockchain (e.g., ledger 402) if desired for audit purposes. It is to be appreciated that a dashboard can be implemented on one or more of the BCNs, one or more computing devices of the enterprise coupled to the distributed ledger system, one or more dedicated computing devices coupled to the system, or some combination thereof.

Given the distributed data management ledger system illustrated in FIG. 4, illustrative embodiments are provided that apply capacity planning and compliant, cost-effective data placement in the multi-cloud computing environment managed by the ledger system. These illustrative embodiments will be described below in the context of FIGS. 5-8. However, it is to be appreciated that while embodiments are well-suited for implementation in a ledger system configured as shown in FIG. 4, other ledger systems can be adapted to implement the capacity planning and compliant, cost-effective data placement techniques described herein.

Figure 5:
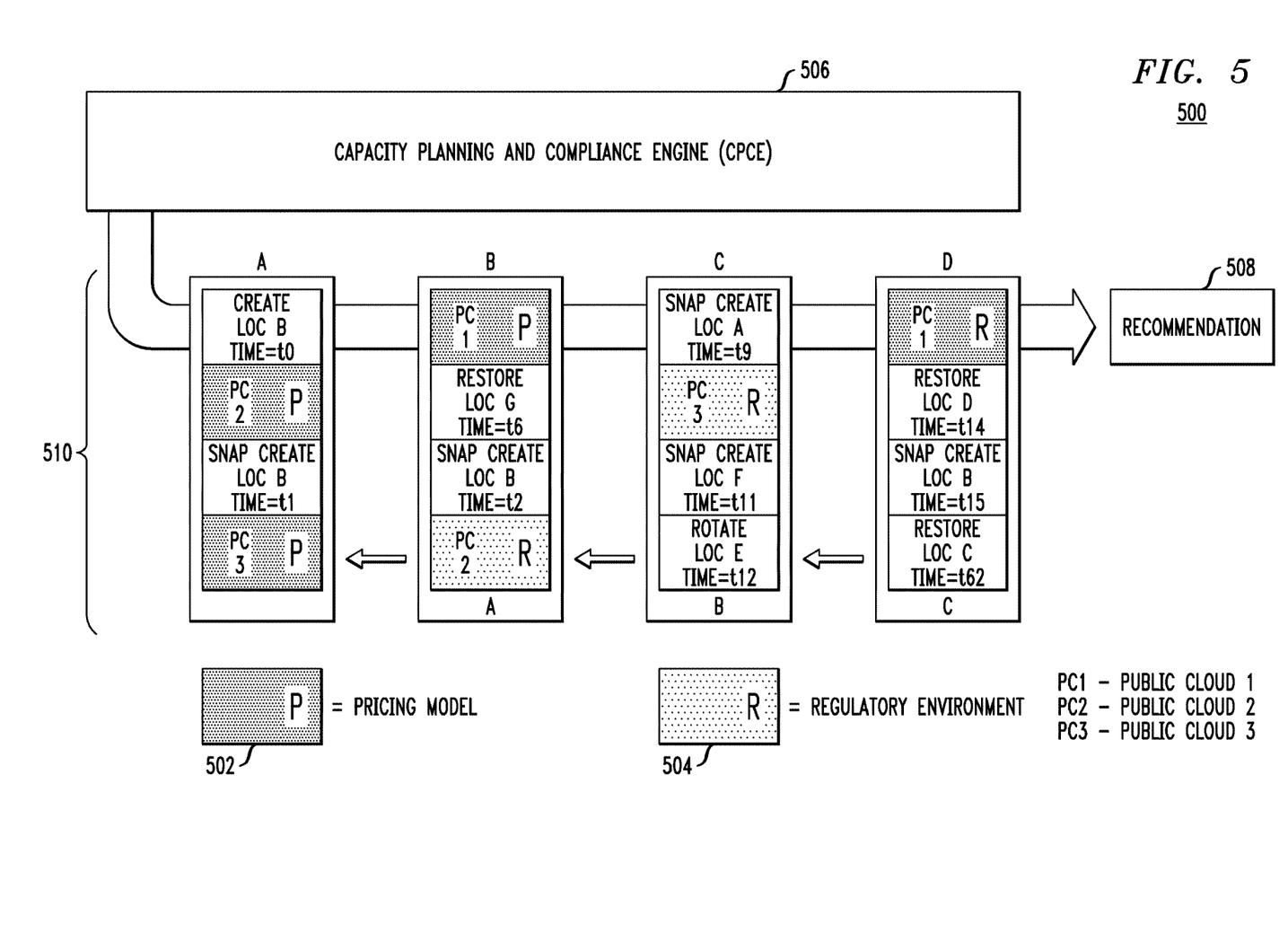
FIG. 5 illustrates a capacity planning and compliance engine for multi-cloud capacity planning and data placement optimization, according to an illustrative embodiment.
Figure 6:
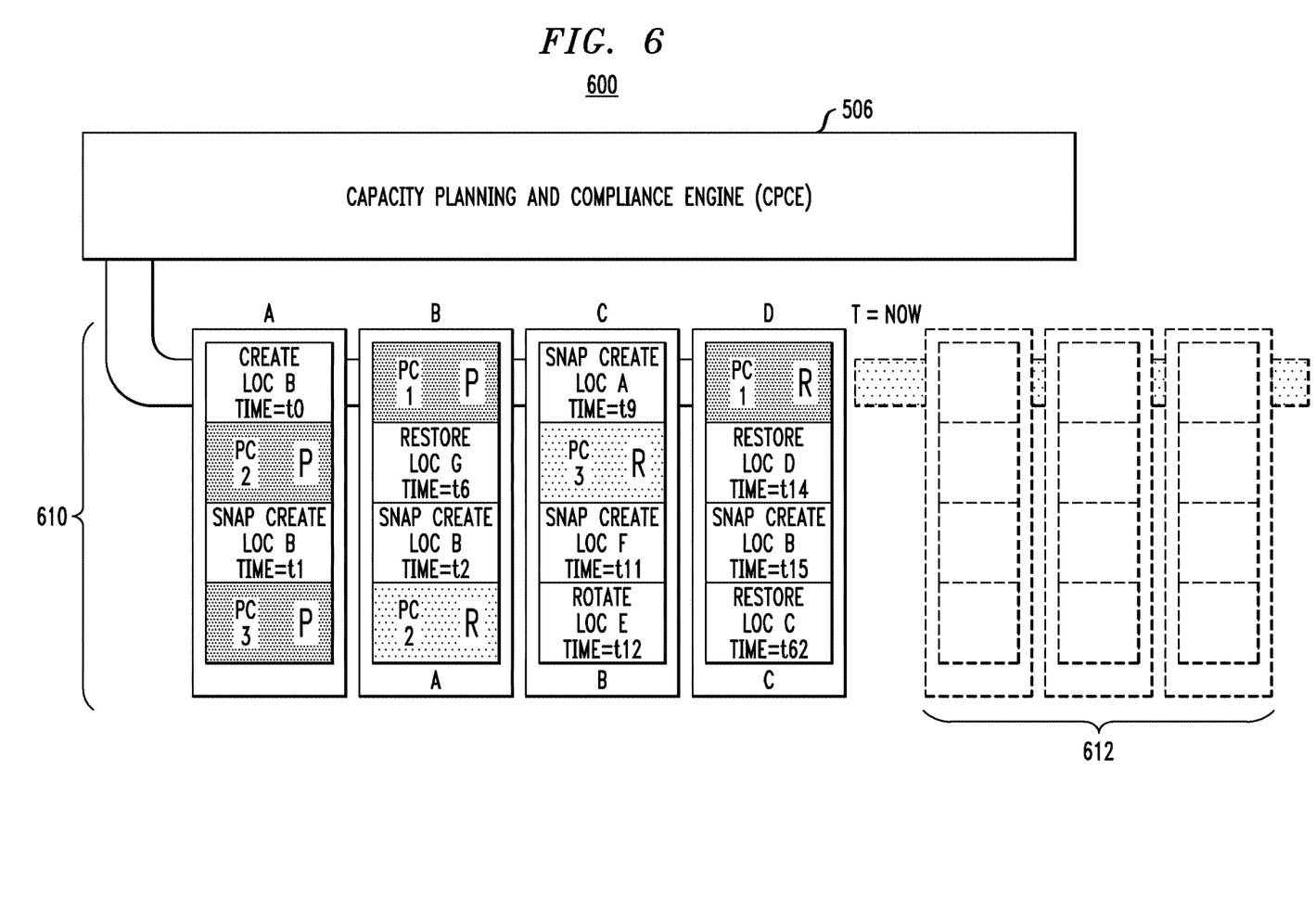
FIG. 6 illustrates an example of projecting multi-cloud data growth over time with the capacity planning and compliance engine of FIG. 5.
Figure 7:
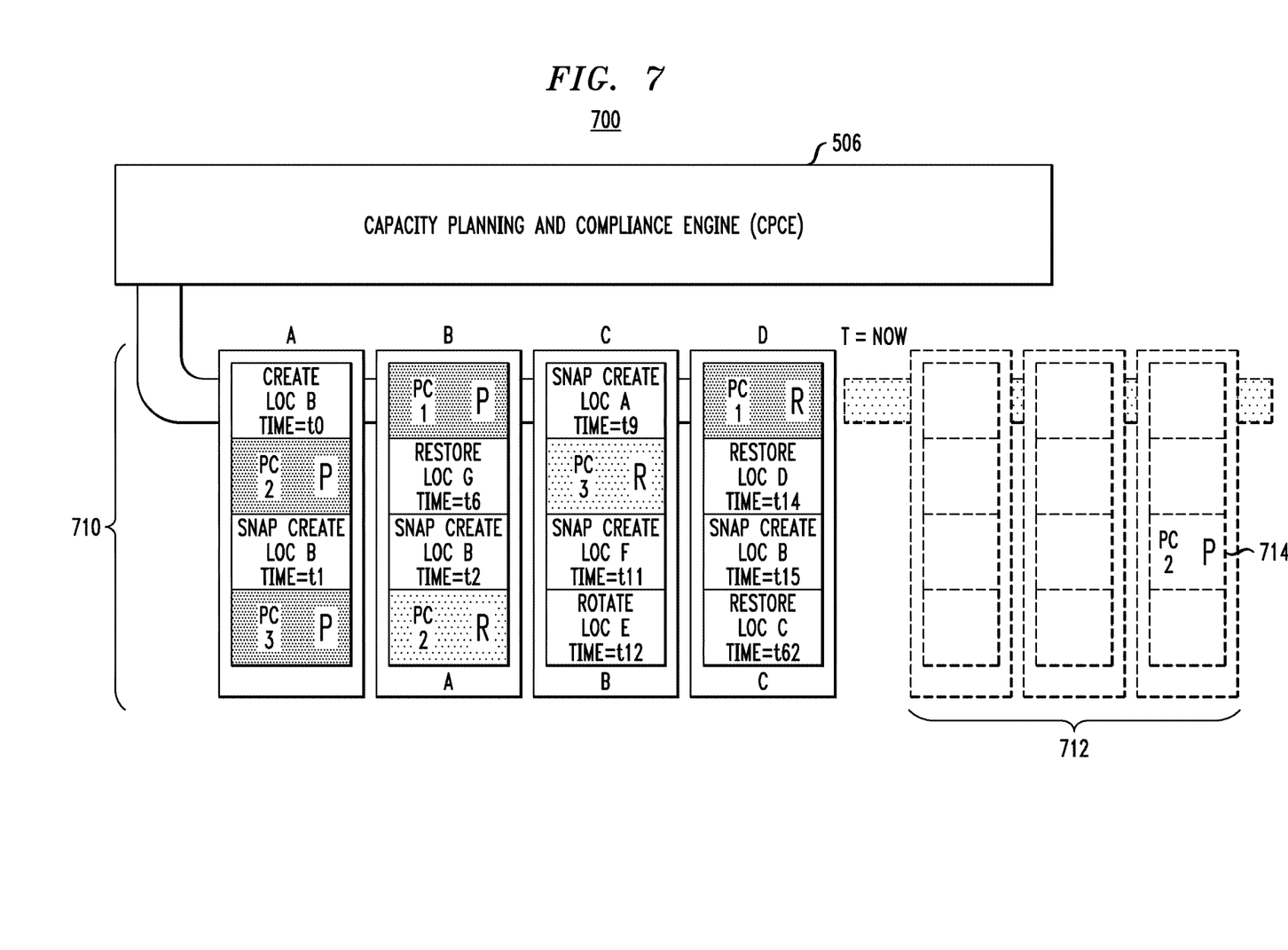
FIG. 7 illustrates an example of modeling future cloud services and pricing with the capacity planning and compliance engine of FIG. 5.

FIG. 5 illustrates a multi-cloud computing environment 500 with a capacity planning and compliance engine for multi-cloud capacity planning and data placement optimization, according to an illustrative embodiment. As will be further explained, illustrative embodiments insert two additional transactions into the ledger system including: (i) pricing transactions; and (ii) compliance/regulatory policy transactions. These additional transactions and various management techniques associated with these additional transactions are controlled by a capacity planning and compliance engine (CPCE) that executes on top of the multi-cloud distributed data management ledger 402.

As shown in FIG. 5, pricing model transactions 502 and regulatory policy transactions 504 are inserted into various blocks of the distributed ledger. The CPCE 506 manages these transactions and makes capacity planning and data placement recommendations 508 based on these transactions, as will be further explained below.

For example, when a cloud provider revises (or introduces) pricing model changes, these pricing models can be time-stamped and securely inserted (transaction 502 represented by "P") into the ledger system 402 by the cloud provider as a data management transaction occurring within the enterprise data management ecosystem.

Further, when regulatory changes are introduced for a specific cloud provider, these changes can be time-stamped and securely inserted (transaction 504 represented by "R") into the ledger system 402 as a data management transaction occurring within the enterprise data management ecosystem.

If an enterprise wishes to introduce regulatory data policies that must apply across all cloud locations, these multi-cloud policies can likewise be inserted into the ledger system 402.

As further shown in FIG. 5, the data management blockchain is iteratively processed by the CPCE 506, building a multi-cloud view of all data assets (depicted as view 510), identifying the pricing models of each cloud provider (public clouds 2 & 3 pricing models in block A, and public cloud 1 pricing model in block B), and considering the regulatory environment in place for each cloud provider (public cloud 2 regulatory policy in block B, public cloud 3 regulatory policy in block C, and public cloud 1 regulatory policy in block D) and/or for the entire multi-cloud regulatory environment. The CPCE 506 allows the enterprise to obtain the current view of the costs of all data capacity that is currently distributed across all clouds in a given multi-cloud computing environment. Note that for ease of reference in FIGS. 5-7, public cloud 1 is referenced as PC1, public cloud 2 is referenced as PC2, and public cloud 3 is referenced as PC3.

As the CPCE 506 builds the current state (and cost) of a multi-cloud computing environment, it also can monitor the evolution of capacity usage for any given cloud provider. As shown in the multi-cloud computing environment 600 in FIG. 6, this allows the CPCE 506 to build a forward-looking view 610 of capacity growth across any given cloud. The capacity growth portion is represented by 612 in FIG. 6.

The CPCE 506 also enables the ability to model pricing changes and/or new services (with new pricing models) in the future (i.e., modeling what-if scenarios). The multi-cloud computing environment 700 in FIG. 7 highlights current view 710 and the introduction of new services/pricing models that are introduced on a given cloud provider (e.g., Google Cloud platform). This future functionality is represented by 712 in FIG. 7 where the new pricing model is represented by transaction 714. This allows the CPCE 506 to recommend (508 in FIG. 5) the movement of data towards or away from a given cloud provider in the future based on changes in price. These recommendations can be based on the current amount of capacity being used or future projected amounts.

Based on the ability to forecast where data should move to achieve the best cost for enterprise, the CPCE 506 also has the ability to constrain that movement based on cost and/or violations of regulatory policies. Consider FIG. 8, in which the CPCE 506 has diagrammed (based on a current view 810) the costs, savings, and potential regulatory violations of moving data away from public cloud 3 (108-3) and towards either public cloud 1 (108-1) or public cloud 2 (108-2). Advantageously, the diagram in FIG. 8 highlights the cost of transferring 16 TB away from public cloud 3 ($38K), shows the best cost savings in a new location (e.g., $48K in public cloud 1 versus $40K in public cloud 2), and flags one compliance violations in public cloud 1 versus none in public cloud 2. These costs are computed by the CPCE 506 based on the pricing model transaction data and the regulatory policy transaction data stored in the ledger system.

Figure 8:
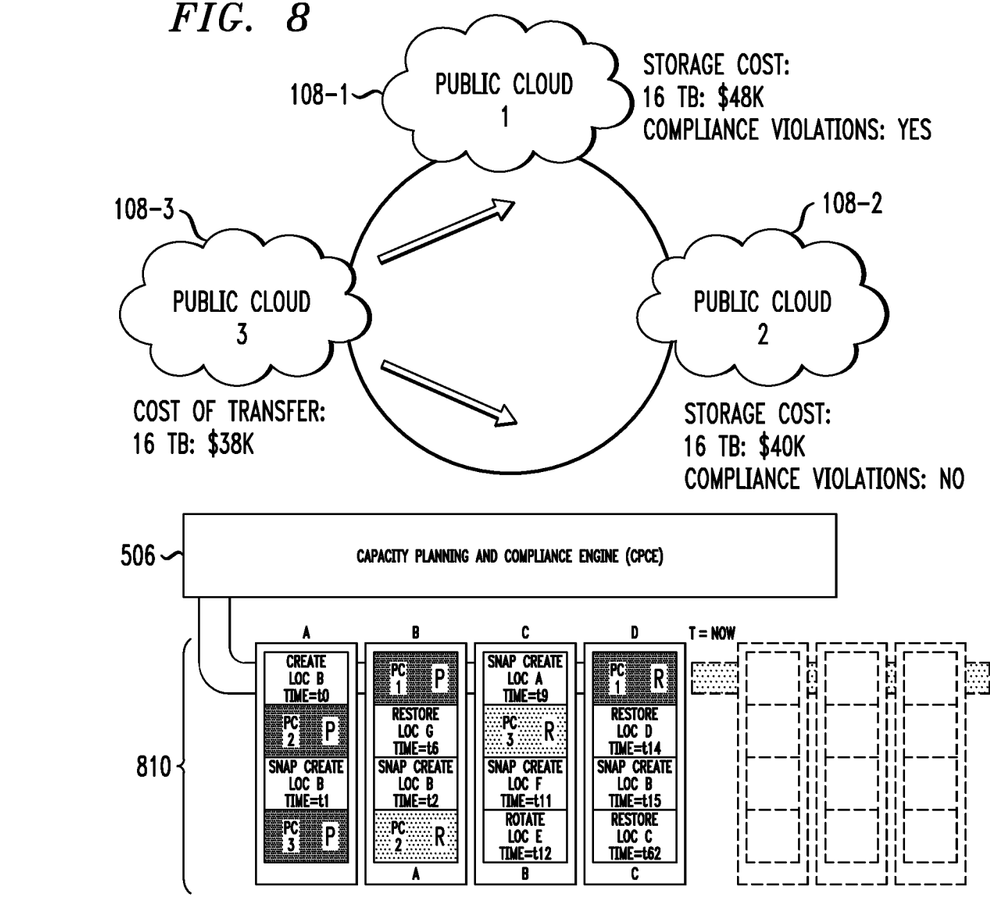
FIG. 8 illustrates an example of recommending data movement cost and compliance options with the capacity planning and compliance engine of FIG. 5.

If a rule of compliance changes, data may need to be move moved to remain compliant. The CPCE 506 therefore can consult the ledger system to verify the copies are still in the correct locations and recommend changes if not. Using the ledger, the CPCE 506 checks for all possible placements of the data and its copies including the new opportunities in new cloud providers, and if there is a compliant, cheaper (optimized) placement of the data for that new provider, the recommendation can be made to place the data with the new provider.

Figure 9:
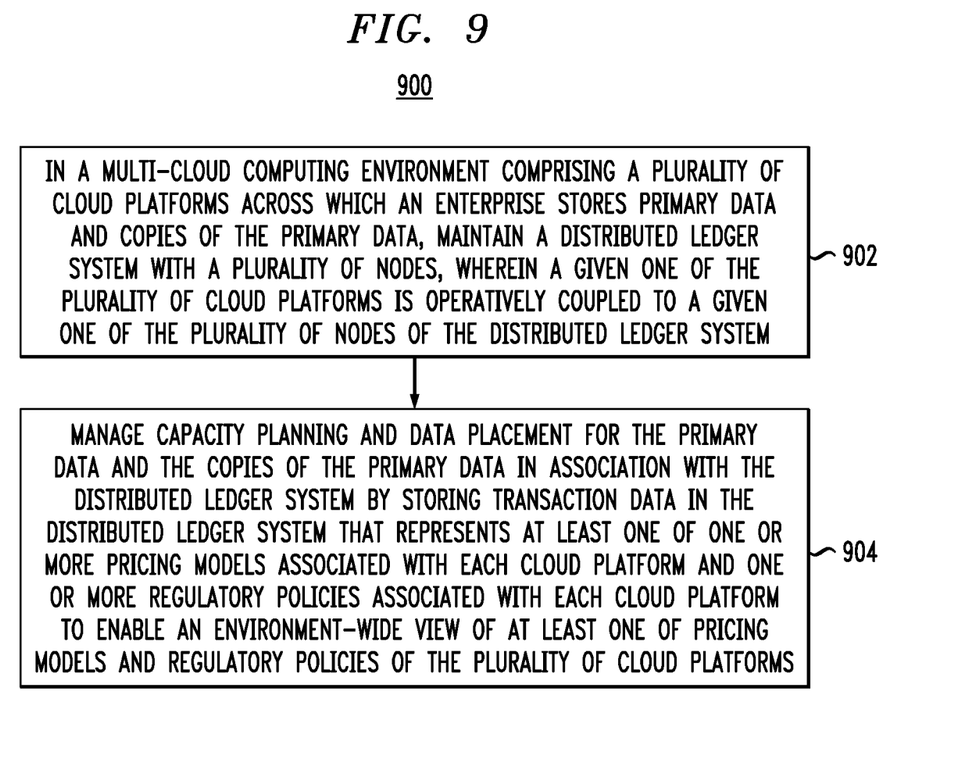
FIG. 9 illustrates a methodology for distributed management of capacity planning and data placement in a multi-cloud computing environment, according to illustrative embodiments.

Given the illustrative description of distributed data protection management techniques herein, FIG. 9 depicts a methodology for distributed management of capacity planning and data placement in a multi-cloud computing environment, according to illustrative embodiments.

In FIG. 9, methodology 900 comprises the following steps. In a multi-cloud computing environment comprising a plurality of cloud platforms across which an enterprise stores primary data and copies of the primary data, step 902 maintains a distributed ledger system with a plurality of nodes, wherein a given one of the plurality of cloud platforms is operatively coupled to a given one of the plurality of nodes of the distributed ledger system. Further, step 904 manages capacity planning and data placement for the primary data and the copies of the primary data in association with the distributed ledger system by storing transaction data in the distributed ledger system that represents one or more pricing models associated with each cloud platform and one or more regulatory policies associated with each cloud platform to enable an environment-wide view of the pricing models and regulatory policies of the plurality of cloud platforms.

At least portions of systems and methods for distributed management of capacity planning and data placement in a multi-cloud computing environment shown in FIGS. 1-9 may be implemented using one or more processing platforms associated with one or more information processing systems. In some embodiments, a given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one. In many embodiments, logic may be executed across one or more physical or virtual processors. In certain embodiments, a virtual processor may be mapped to and executed on or across a portion of one or more virtual or physical processors.

As is apparent from the above, one or more of the processing modules or other components of the systems and methods for distributed management of capacity planning and data placement in a multi-cloud computing environment shown in FIGS. 1-9 may each run on a computer, server, storage device or other processing platform element. A given such element may be viewed as an example of what is more generally referred to herein as a "processing device." An example of such a processing platform is processing platform 1000 shown in FIG. 10.

Figure 10:
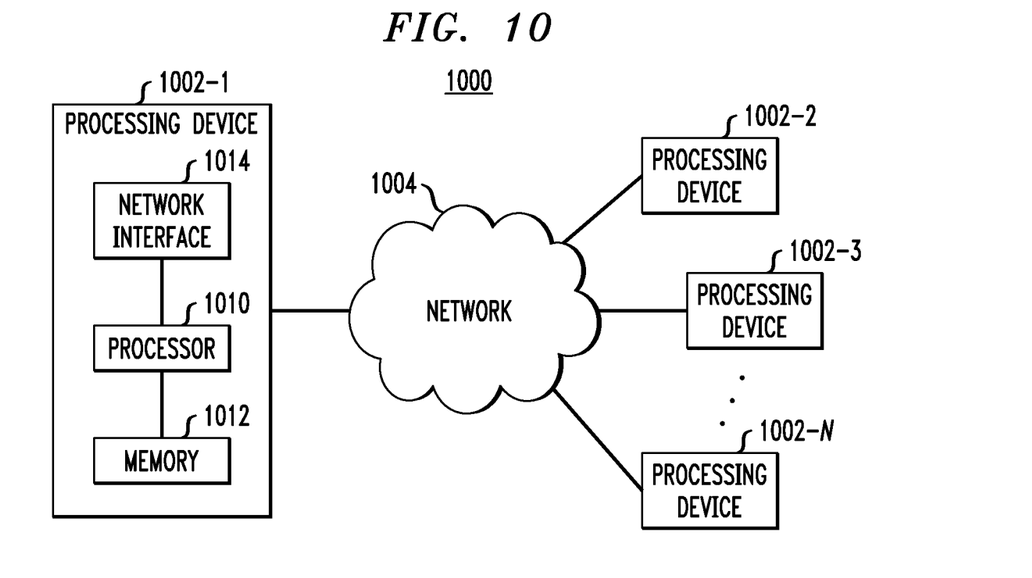
FIG. 10 illustrates a processing platform used to implement a system for distributed management of capacity planning and data placement in a multi-cloud computing environment, according to an illustrative embodiment.

The processing platform 1000 in this embodiment comprises a plurality of processing devices, denoted 1002-1, 1002-2, 1002-3, . . . 1002-N, which communicate with one another over a network 1004.

The network 1004 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

As mentioned previously, some networks utilized in a given embodiment may comprise high-speed local networks in which associated processing devices communicate with one another utilizing Peripheral Component Interconnect Express (PCIe) cards of those devices, and networking protocols such as InfiniBand, Gigabit Ethernet or Fibre Channel.

The processing device 1002-1 in the processing platform 1000 comprises a processor 1010 coupled to a memory 1012.

The processor 1010 may comprise a microprocessor, a microcontroller, an application-specific integrated circuit (ASIC), a field-programmable gate array (FPGA) or other type of processing circuitry, as well as portions or combinations of such circuitry elements.

The memory 1012 may comprise random access memory (RAM), read-only memory (ROM) or other types of memory, in any combination. The memory 1012 and other memories disclosed herein should be viewed as illustrative examples of what are more generally referred to as "processor-readable storage media" storing executable program code of one or more software programs.

Articles of manufacture comprising such processor-readable storage media are considered embodiments of the present disclosure. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1002-1 of the example embodiment of FIG. 10 is network interface circuitry 1014, which is used to interface the processing device with the network 1004 and other system components, and may comprise conventional transceivers.

The other processing devices 1002 of the processing platform 1000 are assumed to be configured in a manner similar to that shown for processing device 1002-1 in the figure.

Again, this particular processing platform is presented by way of example only, and other embodiments may include additional or alternative processing platforms, as well as numerous distinct processing platforms in any combination, with each such platform comprising one or more computers, servers, storage devices or other processing devices.

For example, other processing platforms used to implement embodiments of the disclosure can comprise different types of virtualization infrastructure, in place of or in addition to virtualization infrastructure comprising virtual machines. Such virtualization infrastructure illustratively includes container-based virtualization infrastructure configured to provide Docker containers or other types of Linux containers (LXCs).

The containers may be associated with respective tenants of a multi-tenant environment, although in other embodiments a given tenant can have multiple containers. The containers may be utilized to implement a variety of different types of functionality within the system. For example, containers can be used to implement respective cloud compute nodes or cloud storage nodes of a cloud computing and storage system. The compute nodes or storage nodes may be associated with respective cloud tenants of a multi-tenant environment. Containers may be used in combination with other virtualization infrastructure such as virtual machines implemented using a hypervisor.

As another example, portions of a given processing platform in some embodiments can comprise converged infrastructure such as VxRail™, VxRack™ or Vblock® converged infrastructure commercially available from VCE, the Virtual Computing Environment Company, now the Converged Platform and Solutions Division of Dell EMC. For example, portions of a system of the type disclosed herein can be implemented utilizing converged infrastructure.

It should therefore be understood that in other embodiments different arrangements of additional or alternative elements may be used. In many embodiments, at least a subset of these elements may be collectively implemented on a common processing platform, or each such element may be implemented on a separate processing platform.

Also, in other embodiments, numerous other arrangements of computers, servers, storage devices or other components are possible in the systems and methods for distributed management of capacity planning and data placement in a multi-cloud computing environment. Such components can communicate with other elements of the system over any type of network or other communication media.

As indicated previously, in some embodiments, components of the systems and methods for distributed management of capacity planning and data placement in a multi-cloud computing environment as disclosed herein can be implemented at least in part in the form of one or more software programs stored in memory and executed by a processor of a processing device. For example, at least portions of the execution environment or other system components are illustratively implemented in one or more embodiments the form of software running on a processing platform comprising one or more processing devices.

It should again be emphasized that the above-described embodiments of the disclosure are presented for purposes of illustration only. Many variations and other alternative embodiments may be used. For example, the disclosed techniques are applicable to a wide variety of other types of systems. Also, the particular configurations of system and device elements, associated processing operations and other functionality illustrated in the drawings can be varied in other embodiments. Moreover, the various assumptions made above in the course of describing the illustrative embodiments should also be viewed as exemplary rather than as requirements or limitations of the embodiments. Numerous other alternative embodiments within the scope of the appended claims will be readily apparent to those skilled in the art.

What is claimed is:

1. A method comprising:
in a multi-cloud computing environment comprising a plurality of cloud platforms across which an enterprise stores primary data and copies of the primary data, maintaining a distributed ledger system with a plurality of nodes, wherein a given one of the plurality of cloud platforms is operatively coupled to a given one of the plurality of nodes of the distributed ledger system;
managing capacity planning and data placement for the primary data and the copies of the primary data in association with the distributed ledger system by storing transaction data in the distributed ledger system and generating an environment-wide view of at least one of one or more pricing models associated with the plurality of cloud platforms, one or more regulatory policies associated with the plurality of cloud platforms and data capacity usage of the plurality of cloud platforms;
generating one or more recommendations for the enterprise as to data placement of one of the primary data and the copies of the primary data based on the stored transaction data;
selecting one or more generated recommendations; and
causing the implementation of the selected one or more generated recommendations in the multi-cloud computing environment;

wherein generating a given one of the one or more recommendations for the enterprise as to data placement of one of the primary data and the copies of the primary data based on the stored transaction data comprises:

identifying one or more modified pricing models and one or more modified regulatory policies associated with respective ones of the plurality of cloud platforms based at least in part on at least a portion of the transaction data stored in the distributed ledger system;

predicting future data capacity usage for at least one of the primary data and the copies of the primary data based at least in part on at least a portion of the transaction data stored in the distributed ledger system;

determining a forecast of where at least a portion of at least one of the primary data and the copies of the primary data should be moved from a current storage location on at least a first one of the plurality of cloud platforms to a new storage location on at least a second one of the plurality of cloud platforms based on the identified one or more modified pricing models, the identified one or more modified regulatory policies and the predicted future data capacity usage; and determining a change in cost and whether there are any regulatory compliance violations associated with movement of the at least a portion of the at least one of the primary data and the copies of the primary data from the current storage location on at least the first one of the plurality of cloud platforms to the new storage location on at least the second one of the plurality of cloud platforms;

wherein the method is implemented via one or more processing devices each comprising a processor coupled to a memory.

2. The method of claim 1, wherein the transaction data is time stamped before insertion into the distributed ledger system.

3. The method of claim 1, wherein the managing step further comprises storing one or more regulatory policies established by the enterprise as at least a portion of the transaction data in the distributed ledger system.

4. The method of claim 1, wherein the one or more recommendations take into account: violations of the one or more regulatory policies; and costs associated with the one or more pricing models.

5. The method of claim 1, wherein the environment-wide view captures a complete cost of data capacity distributed across the plurality of cloud platforms.

6. The method of claim 1, wherein the managing step further comprises projecting multi-cloud computing environment growth over time based on the stored transaction data, and making one or more data placement recommendations based on the projecting step.

7. The method of claim 1, wherein the managing step further comprises one or more of modeling future pricing for current or future services of a given one of the plurality of cloud platforms and monitoring changes to the one or more regulatory policies, and making one or more data placement recommendations based on the modeling and monitoring steps.

8. The method of claim 7, wherein the one or more recommendations are based on a current data capacity associated with the multi-cloud computing environment.

9. The method of claim 7, wherein the one or more recommendations are based on a future data capacity associated with the multi-cloud computing environment.

10. The method of claim 1, wherein managing capacity planning and data placement for the primary data and the copies of the primary data comprises data that is at least one of publicly available and privately available.

11. An article of manufacture comprising a non-transitory processor-readable storage medium having stored therein program code of one or more software programs, wherein the program code when executed by at least one processing device causes said at least one processing device to perform steps of:

in a multi-cloud computing environment comprising a plurality of cloud platforms across which an enterprise stores primary data and copies of the primary data, maintaining a distributed ledger system with a plurality of nodes, wherein a given one of the plurality of cloud platforms is operatively coupled to a given one of the plurality of nodes of the distributed ledger system;

managing capacity planning and data placement for the primary data and the copies of the primary data in association with the distributed ledger system by storing transaction data in the distributed ledger system and generating an environment-wide view of at least one of one or more pricing models associated with the plurality of cloud platforms, one or more regulatory policies associated with the plurality of cloud platforms and data capacity usage of the plurality of cloud platforms;

generating one or more recommendations for the enterprise as to data placement of one of the primary data and the copies of the primary data based on the stored transaction data;

selecting one or more generated recommendations; and causing the implementation of the selected one or more generated recommendations in the multi-cloud computing environment;

wherein generating a given one of the one or more recommendations for the enterprise as to data placement of one of the primary data and the copies of the primary data based on the stored transaction data comprises:

identifying one or more modified pricing models and one or more modified regulatory policies associated with respective ones of the plurality of cloud platforms based at least in part on at least a portion of the transaction data stored in the distributed ledger system;

predicting future data capacity usage for at least one of the primary data and the copies of the primary data based at least in part on at least a portion of the transaction data stored in the distributed ledger system;

determining a forecast of where at least a portion of at least one of the primary data and the copies of the primary data should be moved from a current storage location on at least a first one of the plurality of cloud platforms to a new storage location on at least a second one of the plurality of cloud platforms based on the identified one or more modified pricing models, the identified one or more modified regulatory policies and the predicted future data capacity usage; and determining a change in cost and whether there are any regulatory compliance violations associated with movement of the at least a portion of the at least one of the primary data and the copies of the primary data from the current storage location on at least the first one of the plurality of cloud platforms to the new storage location on at least the second one of the plurality of cloud platforms.

12. The article of claim 11, wherein the one or more recommendations take into account: violations of the one or more regulatory policies; and costs associated with the one or more pricing models.

13. The article of claim 11, wherein the managing step further comprises storing one or more regulatory policies established by the enterprise as at least a portion of the transaction data in the distributed ledger system.

14. The article of claim 11, wherein the managing step further comprises one or more of modeling future pricing for current or future services of a given one of the plurality of cloud platforms and monitoring changes to the one or more regulatory policies, and making one or more data placement recommendations based on the modeling and monitoring steps.

15. The article of claim 14, wherein the one or more recommendations are based on a future data capacity associated with the multi-cloud computing environment.

16. A system comprising:
one or more processing devices configured to:
in a multi-cloud computing environment comprising a plurality of cloud platforms across which an enterprise stores primary data and copies of the primary data, maintain a distributed ledger system with a plurality of nodes, wherein a given one of the plurality of cloud platforms is operatively coupled to a given one of the plurality of nodes of the distributed ledger system;
managing capacity planning and data placement for the primary data and the copies of the primary data in association with the distributed ledger system by storing transaction data in the distributed ledger system and generating an environment-wide view of at least one of one or more pricing models associated with the plurality of cloud platforms, one or more regulatory policies associated with the plurality of cloud platforms and data capacity usage of the plurality of cloud platforms;
generate one or more recommendations for the enterprise as to data placement of one of the primary data and the copies of the primary data based on the stored transaction data;
select one or more generated recommendations; and
cause the implementation of the selected one or more generated recommendations in the multi-cloud computing environment;
wherein generating a given one of the one or more recommendations for the enterprise as to data placement of one of the primary data and the copies of the primary data based on the stored transaction data comprises:
identifying one or more modified pricing models and one or more modified regulatory policies associated with respective ones of the plurality of cloud platforms based at least in part on at least a portion of the transaction data stored in the distributed ledger system;
predicting future data capacity usage for at least one of the primary data and the copies of the primary data based at least in part on at least a portion of the transaction data stored in the distributed ledger system;
determining a forecast of where at least a portion of at least one of the primary data and the copies of the primary data should be moved from a current storage location on at least a first one of the plurality of cloud platforms to a new storage location on at least a second one of the plurality of cloud platforms based on the identified one or more modified pricing models, the identified one or more modified regulatory policies and the predicted future data capacity usage; and
determining a change in cost and whether there are any regulatory compliance violations associated with movement of the at least a portion of the at least one of the primary data and the copies of the primary data from the current storage location on at least the first one of the plurality of cloud platforms to the new storage location on at least the second one of the plurality of cloud platforms.

17. The system of claim 16, wherein the managing step further comprises storing one or more regulatory policies established by the enterprise as at least a portion of the transaction data in the distributed ledger system.

18. The system of claim 16, wherein the one or more recommendations take into account: violations of the one or more regulatory policies; and costs associated with the one or more pricing models.

19. The system of claim 16, wherein the managing step further comprises projecting multi-cloud computing environment growth over time based on the stored transaction data, and making one or more data placement recommendations based on the projecting step.

20. The system of claim 16, wherein the managing step further comprises one or more of modeling future pricing for current or future services of a given one of the plurality of cloud platforms and monitoring changes to the one or more regulatory policies, and making one or more data placement recommendations based on the modeling and monitoring steps.

* * * * *